US012654527B2

(12) United States Patent
Kramer

(10) Patent No.: US 12,654,527 B2
(45) Date of Patent: Jun. 16, 2026

(54) TAILGATE PAD

(71) Applicant: Send It LLC, Erie, CO (US)

(72) Inventor: Cole Kramer, Erie, CO (US)

(73) Assignee: Send It LLC, Erie, CO (US)

( * ) Notice: Subject to any disclaimer, the term of this patent is extended or adjusted under 35 U.S.C. 154(b) by 306 days.

(21) Appl. No.: 18/370,483

(22) Filed: Sep. 20, 2023

(65) Prior Publication Data

US 2025/0091419 A1      Mar. 20, 2025

(51) Int. Cl.
B60J 11/06 (2006.01)
B60R 9/06 (2006.01)
B60R 9/10 (2006.01)

(52) U.S. Cl.
CPC ................. B60J 11/06 (2013.01); B60R 9/06 (2013.01); B60R 9/10 (2013.01)

(58) Field of Classification Search
CPC ............... B60J 11/06; B60R 9/06; B60R 9/10
See application file for complete search history.

(56) References Cited

U.S. PATENT DOCUMENTS

| | | | | |
|---|---|---|---|---|
| 4,957,400 | A | * | 9/1990 | Karp ......................... B60R 9/04 |
| | | | | 224/403 |
| 6,695,556 | B2 | * | 2/2004 | Addy ......................... B60R 9/00 |
| | | | | 410/97 |
| 8,061,761 | B1 | | 11/2011 | Sierra |

| | | | | |
|---|---|---|---|---|
| 9,701,225 | B1 | | 7/2017 | Hogan et al. |
| 10,300,861 | B1 | * | 5/2019 | Green ........................ B60R 7/02 |
| D969,049 | S | * | 11/2022 | He ................................ D12/196 |
| 11,565,631 | B2 | * | 1/2023 | Shneyer ................... E05B 71/00 |
| 11,760,271 | B2 | * | 9/2023 | Low ........................... B60R 9/10 |
| | | | | 296/39.1 |
| D1,027,763 | S | * | 5/2024 | Wu .............................. D12/196 |
| 2020/0215957 | A1 | | 7/2020 | Starkey |
| 2022/0001808 | A1 | | 1/2022 | Low et al. |
| 2022/0379817 | A1 | * | 12/2022 | Gu ............................ B60R 9/06 |
| 2023/0059483 | A1 | | 2/2023 | Low et al. |
| 2025/0326282 | A1 | * | 10/2025 | Chambers ................ B60J 11/06 |

FOREIGN PATENT DOCUMENTS

| | | | | | |
|---|---|---|---|---|---|
| CA | | 1331916 | C | * 9/1994 | ........... G09F 21/048 |
| WO | WO-2019232565 | A1 | * | 12/2019 | ................ B60N 3/04 |

OTHER PUBLICATIONS

WO-2019232565-A1 English Translation (Year: 2019).*
CA-1331916-C English Translation (Year: 1994).*
International Search Report issued in corresponding PCT Application No. PCT/US2024/032800, dated Sep. 4, 2024.

* cited by examiner

*Primary Examiner* — Michael T. Walsh
(74) *Attorney, Agent, or Firm* — Norton Rose Fulbright US LLP

(57)      ABSTRACT

This disclosure describes systems, methods, and apparatus for a tailgate pad comprising an inside panel, an outside panel, and a folding panel, wherein the folding panel comprises a plurality of ribs to stretch the folding panel in an accordion-like manner over a top end of tailgate. Other tailgate pad features include straps and fasteners, raised pads, pockets and adjustable windows.

12 Claims, 9 Drawing Sheets

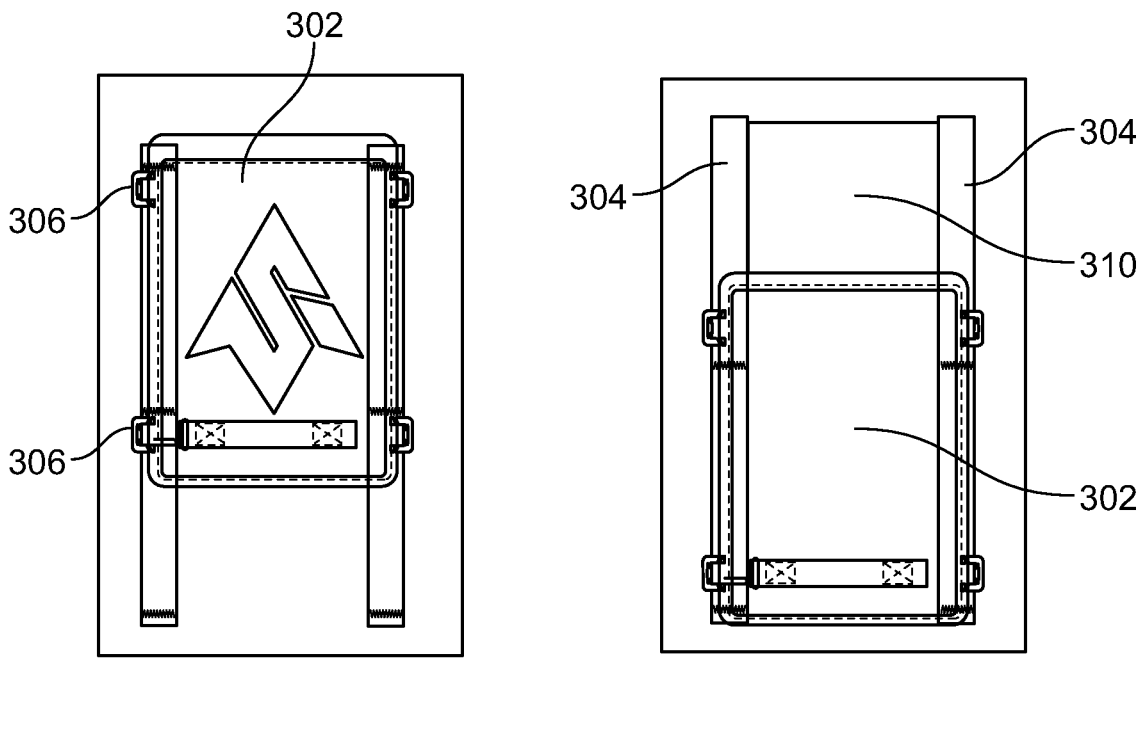
FIG. 3A                    FIG. 3B
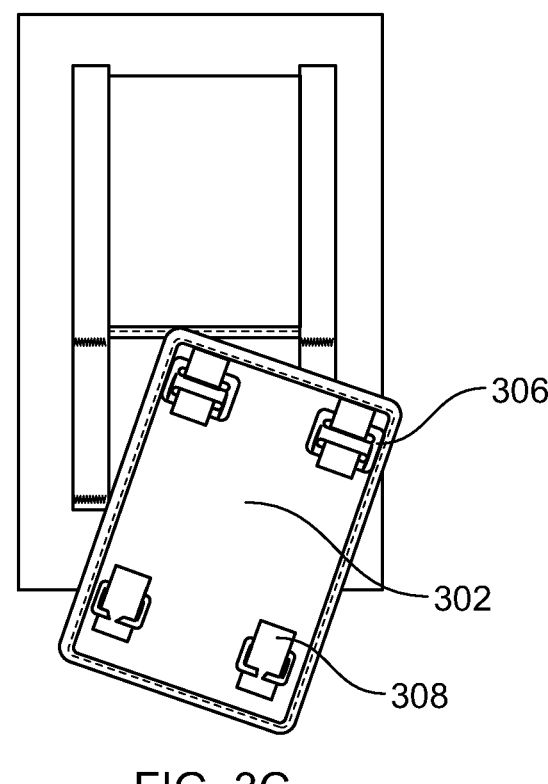
FIG. 3C

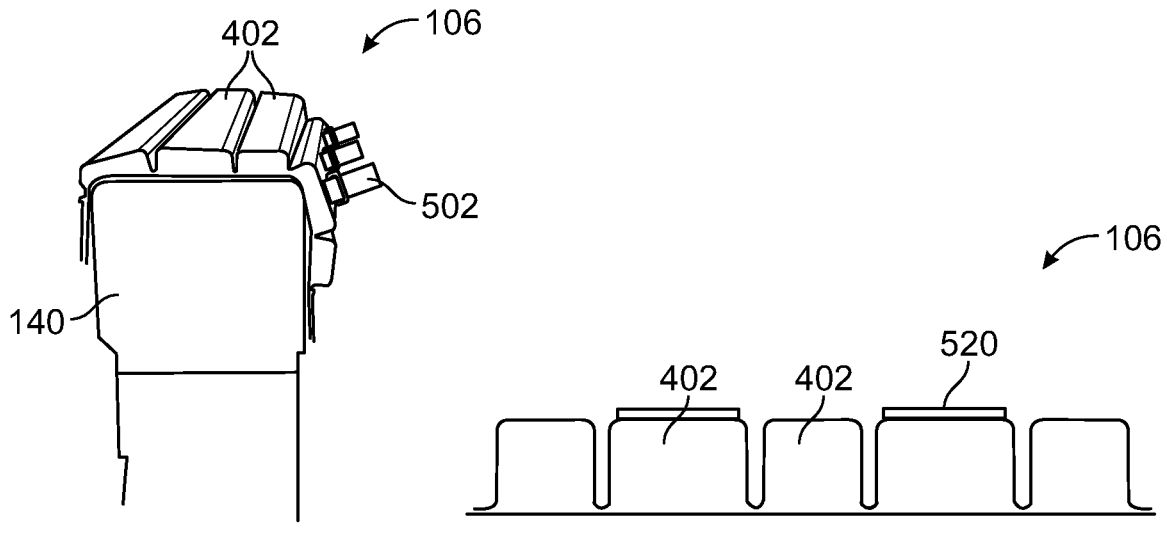
FIG. 4A                  FIG. 4B

TAILGATE PAD

FIELD OF THE DISCLOSURE

The present disclosure relates generally to tailgate pads.

DESCRIPTION OF RELATED ART

Often trucks and other vehicles are used to haul items from one location to another. Sometimes, the tailgate portion of the vehicle is used to position items. For example, a bicycle will be positioned straddling the tailgate such that part of the bicycle will sit in the vehicle bed and part of the bicycle will rest against the outside of the tailgate. However, transporting items using one or both sides of the tailgate as support can cause damage to the tailgate and/or the item that is being transported. To minimize or prevent this damage, protective pads that are attached to the tailgate may be used.

However, different vehicles have different sized and shaped tailgates. As such, there is a desire for a protective tailgate pad that can be sized to accommodate a variety of tailgate thicknesses and/or widths.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a tailgate pad comprising an inside panel, an outside panel and a folding panel, wherein the folding panel comprises a plurality of ribs to extend the folding panel in an accordion-like manner over a top end of tailgate. In some embodiments, the tailgate pad further comprises a plurality of straps coupled to the inside panel, at least one of said plurality of straps configured to be coupled to a respective at least one of a plurality of fasteners coupled to the outside panel to facilitate securing the tailgate pad to a tailgate. In some embodiments, the tailgate pad has a plurality of raised pads coupled to the outside panel, and in some embodiments, the plurality of raised pads are spaced in a vertical manner to accommodate a wheel of a bicycle between each raised pad. The tailgate pad can also have a raised pad coupled to the inside panel. The tailgate pad can have various features, including, but not limited to, a pocket coupled to the inside panel, an adjustable window coupled to the outside panel, wherein the adjustable window comprises a door that slidingly moves along two rails, and two or more straps coupled to a rib of the folding panel, wherein the two or more straps are configured to couple to a plurality of fasteners affixed to the folding panel.

Other embodiments of the disclosure may also be characterized as a tailgate pad, comprising an inside panel, an outside panel, a folding panel, wherein the folding panel comprises a plurality of ribs to extend the folding panel in an accordion-like manner over a top end of tailgate, wherein each rib has a thickness, and two or more straps coupled to a rib of the folding panel, wherein the two or more straps are configured to couple to a plurality of fasteners affixed to the folding panel. In some embodiments, the thickness of each rib varies between ribs. In some embodiments, each of the plurality of ribs is separated from one another by one of nylon, plastic, polyester, fleece, microfiber, flannel, a synthetic and/or natural textile lining, a tricot fabric, a nonwoven textile, polymer foams. In some embodiments, the tailgate pad also has an adjustable window coupled to the outside panel, wherein the adjustable window comprises a door that slidingly moves along two rails.

Other embodiments of the disclosure can be characterized as a method for installing a tailgate pad, the method comprising aligning an inside panel to an inside portion of a tailgate, wherein the tailgate is in an open position; threading one or more straps coupled to the inside panel through an opening in the tailgate; closing the tailgate; aligning a folding panel around a top portion of the tailgate; aligning an outside panel along an outside portion of the tailgate; and coupling the one or more straps into one or more fasteners coupled to the outside panel.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIGS. 3A-C show a window with an adjustable door, in accordance with embodiments of the present disclosure.

FIGS. 4A and 4B are views of a folding panel, in accordance with embodiments of the present disclosure.

Figure 1:
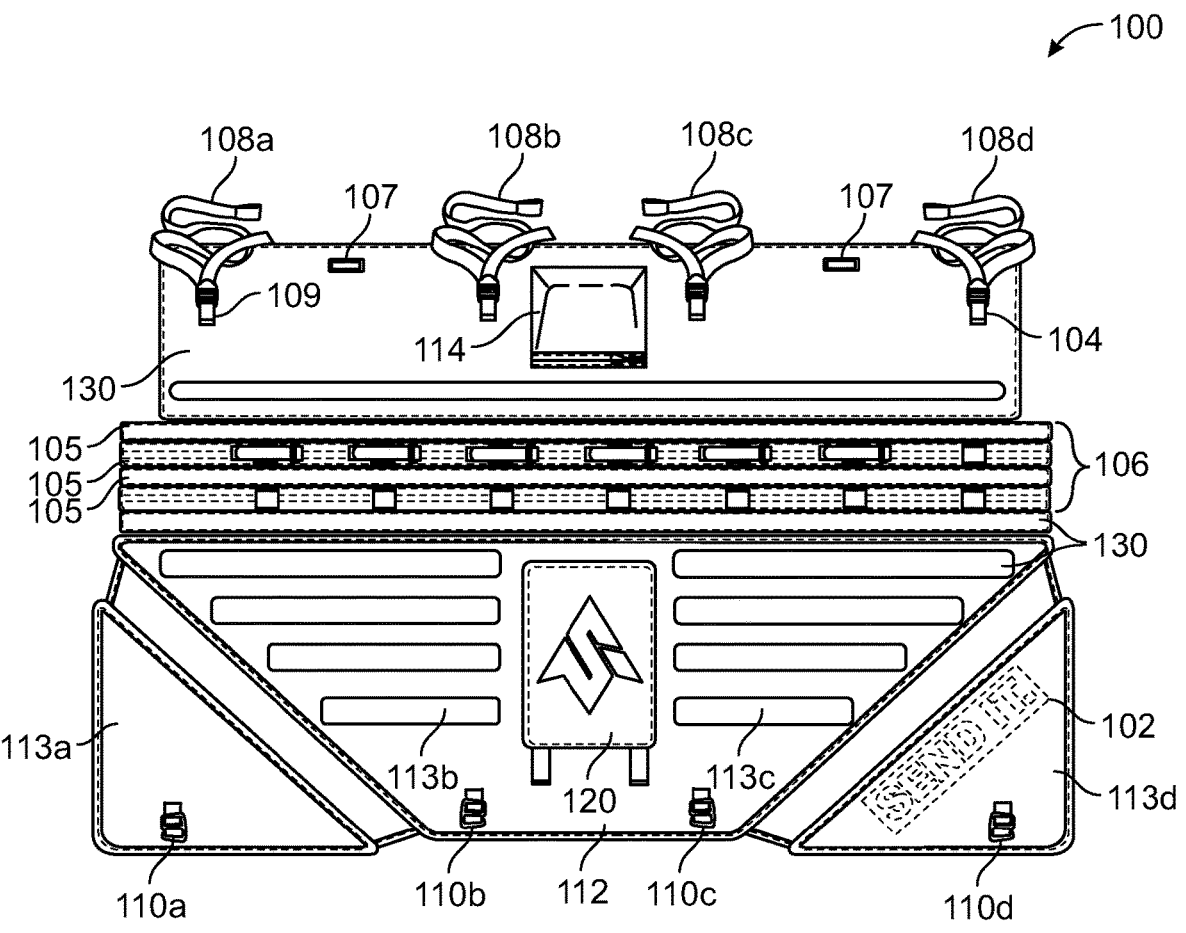
FIG. 1 is a perspective view of an adjustable tailgate pad, in accordance with embodiments of the present disclosure.

The drawings referred to in this description should be understood as not being drawn to scale except if specifically noted.

DETAILED DESCRIPTION

Prior to describing the embodiments in detail, it is expedient to define terms as used in this document. For the purpose of this document, relational terms such as, without limitation, "lateral", "longitudinal", "perpendicular", "parallel", and "flat" shall be understood to mean within reasonable manufacturing tolerances accepted in the tailgate pad manufacturing industry.

The word "exemplary" is used herein to mean "serving as an example, instance, or illustration." Any embodiment described herein as "exemplary" is not necessarily to be construed as preferred or advantageous over other embodiments.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

As explained above, in some instances, owners of tailgate-equipped vehicles may utilize the tailgate when transporting items such as a bicycle. For purposes of brevity and clarity, the following discussion will refer to the tailgate of a truck. It should be understood, however, that the present embodiments are also well suited to use with a tailgate of a vehicle other than a truck. Moreover, embodiments of the present disclosure are well suited for use when transporting a wide variety of items, for example, a motorcycle, a snow board, a surfboard, a paddleboard, a kayak, ski equipment, furniture, lumber or other items which may be transported in the bed of a truck. That said, for purposes of brevity and clarity, and not to be interpreted as a limitation, the following discussion will describe embodiments of the present disclosure while referring to a truck tailgate being used to support a bicycle.

As will be described in detail below, embodiments of the present disclosure provide a tailgate pad. Referring now to FIG. 1, a top perspective view of an adjustable tailgate pad 100 is shown, in accordance with embodiments of the present disclosure. Tailgate pad 100 includes an outside panel 102, an inside panel 104, and a folding panel 106. The outside panel 102 is configured to be secured to the outside of a tailgate (i.e., facing the driver behind the vehicle.) The inside panel 104 is configured to be secured to the inside of a tailgate (i.e., the bed-side of the vehicle.) Folding panel 106 is configured to be secured to the top of a tailgate.

In embodiments of the present disclosure, each of outside panel 102, inside panel 104 and folding panel 106 has a thickness. For example, in some embodiments, inside panel 104 and outside panel 102 are in the range of approximately 1.5 cm-7 cm in thickness, while folding panel 106 is in the range of approximately 2 cm to 6 cm in thickness. In some embodiments, outside panel 102, inside panel 104 and folding panel 106 comprise a padding material, including, but not limited to a Polyethylene (PE) Foam, Polyurethane (PU) Foam, vinyl, etc.

In embodiments of the present disclosure, inside panel 104 of tailgate pad 100 has a plurality of straps, shown as 108a-108d, removably coupled to inside panel 104 via a plurality of fasteners 109a-109d. Although four straps 108a-108d and four fasteners 109a-109d are shown in the embodiment of FIG. 1, in some embodiments of the present disclosure, inside panel 104 will have more than four straps and fasteners. Further, in some embodiments of the present disclosure, inside panel 104 will have less than four straps and fasteners. Additionally, in some embodiments, the location and/or the spacing between the plurality of straps 108a-108d and fasteners 109a-109d will differ from the location and/or spacing of straps 108a-108d and fasteners 109a-109d as depicted in FIG. 1. For example, while FIG. 1 illustrates an embodiment where straps 108a-108d and fasteners 109a-109d are spaced approximately equidistant from one another, in other embodiments, two or more straps (i.e., straps 108a and 108b) and fasteners (i.e., fasteners 109a and 109b) may be spaced closer to one another than to the other straps (i.e., straps 108c and 108d) and fasteners (i.e., fasteners 109c and 109d).

In embodiments of the present disclosure, fasteners 109a-109d are used to removably secure the plurality of straps 108a-108d to the inside panel 104. Examples of fasteners may include, but are not limited to, a buckle, a cinch ring, a hook-and-loop fastener, a clamping lock, a spring snap clip, a ladderlock buckle, etc., such that each strap 108a, 108b, 108c, and 108d can be removably secured to each of fasteners 109a, 109b, 109c and 109d. In other embodiments, fasteners 109a-d are used to secure the plurality of straps 108a-108d to the inside panel 104 in a fixed manner.

Figure 2:
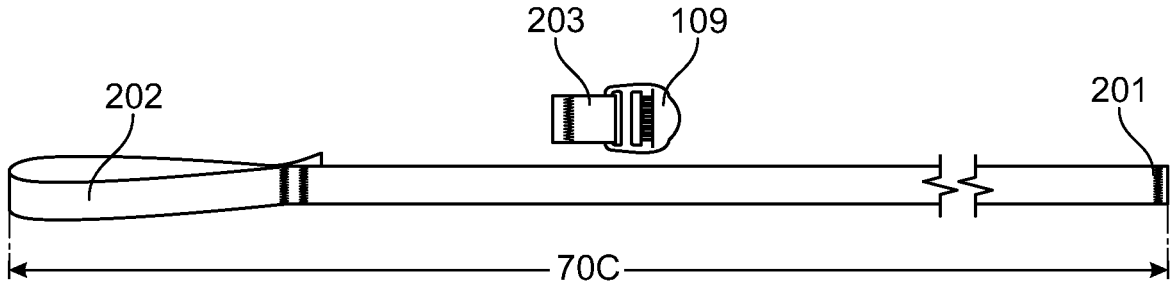
FIG. 2 is a perspective view of a strap, in accordance with embodiments of the present disclosure.

With reference to some embodiments of the present disclosure illustrated in FIG. 2, straps 108a-108d are composed of a material such as polyester, nylon, canvas or the like. In some embodiments, straps 108a-108d include a Velcro portion to aid in securing the straps. In some embodiments, a first end 201 of each strap 108 is configured to removably fasten to a fastener 109 that is coupled to a tab 203. Tab 203 is affixed to inside panel 104. With reference to FIG. 1, in some embodiments, there are four tabs 203 affixed to inside panel 104. However, in other embodiments, any other number of tabs are affixed to inside panel 104.

A second end 202 of strap 108 is configured to fasten to a fastener 110. The second end 202 of strap 108 in FIG. 2 is configured as a loop. However, in other embodiments, second end 202 is configured as a buckle, a cinch ring, a clamping lock, a spring snap clip, a ladderlock buckle, or another type of fastener. In some embodiments of the present disclosure, strap 108 is approximately 2.5 cm wide and approximately 70 cm in length. However, in other embodiments, strap 108 can have a width ranging from approximately 1.5 cm to 5 cm and a length of approximately 50 cm to 120 cm.

With further reference to embodiments of the present disclosure illustrated in FIG. 1, inside panel 104 has one or more locking holes 107a and 107b. In some embodiments, locking hole 107a and 107b is reinforced with a grommet, PowerTab, BravoTab stitching, D-ring, eyelet, webbing loop, or like, to minimize damage to the interior part of inside panel 104. In some embodiments, locking holes 107a and 107b are sized with a height of approximately 4 cm and a width of approximately 8 cm. However, in other embodiments, locking holes 107a and 107b can have a width ranging from approximately 3 cm to 10 cm and a height of approximately 2 cm to 6 cm. In some embodiments, locking holes 107a and 107b are used to lock pad 100 to a vehicle, such that pad 100 cannot be stolen. In such embodiments, a first lock, such as a locking cable or other type of mechanism is affixed to a vehicle through one of locking hole 107a or 107b, and a second end of a lock is affixed elsewhere to the vehicle, such that the pad 100 cannot be readily removed from the vehicle because it is affixed by the lock.

In some embodiments of the present disclosure, inside panel 104 includes one or more pockets 114 affixed thereon. Pockets 114 are sized and shaped to fit somewhere between a top portion 105 and a bottom portion 103 of inside panel 104. For example, in some embodiments pocket 114 is approximately 23 cm in height and approximately 30 cm in width, with a depth of approximately 3-6 cm. In other embodiments, pocket 114 is anywhere from 5-20 cm in height, 30-140 cm in width, and 2 cm-8 cm in depth. While FIG. 1 illustrates a single pocket 114, in other embodiments, multiple pockets 114 may be affixed to inside panel 104. In some embodiments, pocket 114 has a zipper to open and close the pocket. In other embodiments, pocket 114 is configured with a fold-over top or another type of fastener, including, but not limited to, snaps, buttons, hook and eye enclosures, Velcro, buckles and magnets.

In embodiments of the present disclosure, outside panel 102 of tailgate pad 100 has a plurality of strap fasteners, typically shown as 110a-110d, coupled thereto. Although four strap fasteners 110a-110d are shown in the embodiment of FIG. 1, in some embodiments of the present disclosure, tailgate pad 100 will have more than four strap fasteners. Further, in some embodiments of the present disclosure, tailgate pad 100 will have less than four strap fasteners. Additionally, in some embodiments, the location and/or the spacing between the plurality of strap fasteners 110a-110d will differ from the location and/or spacing of strap fasteners 110a-110d as depicted in FIG. 1. For example, while FIG. 1 illustrates an embodiment where strap fasteners 110a-110d are spaced approximately equidistant from one another, in other embodiments, two or more strap fasteners may be spaced closer to one another than to the remaining strap fasteners. In some embodiments, strap fasteners 110a-110d are affixed to outside panel 102 at a distance such that the fastening devices 112 do not rub or abut against the vehicle. For example, in some embodiments, strap fasteners 110a-110d are affixed at a distance of approximately 2 cm-4 cm from the bottom edge of the outside panel 102.

With reference to an embodiment illustrated in FIG. 1, each of strap fasteners 110a-110d comprises a tab 113a-113d and a fastening device 112. Each tab 113 is affixed to outside panel 102. Examples of fastening device 112 may include, but are not limited to, a buckle, a cinch ring, a hook-and-loop fastener, a clamping lock, a spring snap clip, a ladderlock buckle, etc. In some embodiments, tabs 113a-113d comprise one of polyester, nylon, canvas or the like.

Referring still to FIG. 1, in various embodiments, straps 108a-108d and retaining fasteners 110a-110d are used to facilitate securing tailgate pad 100 to a tailgate. In one such embodiment, straps 108a-108d are configured to be placed under or threaded through a bottom portion of a tailgate to couple to the fastening devices 112 of strap fasteners 110a-110d to secure the straps 108a-108d to the tailgate of a vehicle. This method will be described further, below.

With further reference to FIG. 1, in some embodiments outside panel 102 has a window 120. In various embodiments, window 120 comprises an open space within outside panel 102. In other embodiments, window 120 has an adjustable door, such that when window 120 of outside panel 102 is open, window 120 will permit access to, for example, a tailgate-mounted backup camera, a tailgate handle, or other tailgate features. In some embodiments, window 120 is configured in a rectangular shape that is approximately centered about the length of outside panel 102. Although such a location of window 120 is shown in the embodiment of FIG. 1, in some embodiments, tailgate pad 100 will have window 120 disposed in the outside panel 102 at a location other than as depicted in FIG. 1. Further, in some embodiments, window 120 of tailgate pad 100 will have a non-rectangular shape. In other embodiments, outside panel 102 does not have a window.

With reference now to FIGS. 3A, 3B and 3C, several front perspective views of an adjustable window 300 in various position with respect to window 120 of tailgate pad 100 is shown. In FIGS. 3A, 3B and 3C, adjustable window 120 comprises an opening 310, an adjustable door 302, one or more rails 304, and two or more rail clips 306.

As seen in FIG. 3C, in some embodiments, adjustable door 302 has two or more rail clips 306 coupled to it by two or more attachment mechanisms 308. In some embodiments, attachment mechanisms 308 are nylon webbing. In other embodiments, attachment mechanisms 308 are tape, glue, polypropene material, polyester material, hooks, stitching or the like. In some embodiments, rail clips 306 are quick clips. In other embodiments, rail clips can be hooks, buckles, rings, and the like. For example, in the embodiment illustrated in FIG. 3C, rail clips 306 are a mixture of buckles and rings.

In some embodiments, attachment mechanisms 308 affix to the underside of adjustable door 302 by being sewn onto the underside of door 302. In other embodiments, attachment mechanisms 308 affix to the underside of adjustable door 302 by glue, Velcro, staples, tape, nails or the like.

In some embodiments, adjustable door 302 is comprised of a rigid foam material, however, the material of adjustable door 302 is not limited and can comprise metal, plastic, wood or other materials.

In some embodiments, rails 304 comprise one or more nylon webbing or straps. In some embodiments, the straps comprise Velcro material to aid in securing the straps to outside panel 102. In other embodiments, rails 304 comprise metal rails, plastic rails, or the like. Rails 304 are configured to slidingly engage with rail clips 306 such that door 302 can slidingly move up and down along rails 304. For example, in embodiments containing nylon webbing, the rails 304 are affixed to outside panel 102 at a top portion of rails 304 and bottom portion of rails 304, such that the door 302 can move between the top and bottom rail portions. In some embodiments, rails 304 have a length that can permit the entirety of door 302 to clear opening 310 when door 302 has moved to the lowest point of rails 304. In some embodiments, the top and bottom parts of rails 304 have a stop to prevent the door from coming off of the rails. For example, in some embodiments, the stop is created by affixing the ends of the rails to the outside panel 102 (i.e., glue, stitching, tape, etc.) In other embodiments, rails 304 can include one or more stopping devices (not shown), to prevent the door from detaching from the rails.

As seen in FIGS. 3A-3C, in some embodiments, adjustable door 302 moveably couples to one or more rails 304 via two or more rail clips 306. For example, in some embodiments, during manufacture, rail clips 306 are coupled to rails 304 before rails 304 are affixed to outside panel 10. Rail clips 306 can slide up and down rails 304, thereby allowing coupled adjustable door 302 to slide up and down rails 304.

In FIG. 3A, adjustable door 302 is shown completely extending across opening 310, such that opening 310 is no longer visible. In FIG. 3B, adjustable door 302 is shown extending across opening 310, such that opening 310 is mostly visible. As stated above, in various embodiments of tailgate pad 100, outside panel 102 has a window 120 formed therein. When window 120 of outside panel 102 is open, that is, adjustable door 302 is in the position as depicted in FIG. 3B, opening 310 will expose, for example, a tailgate-mounted backup camera, a tailgate handle, a retractable step, or other tailgate features.

Figure 7A:
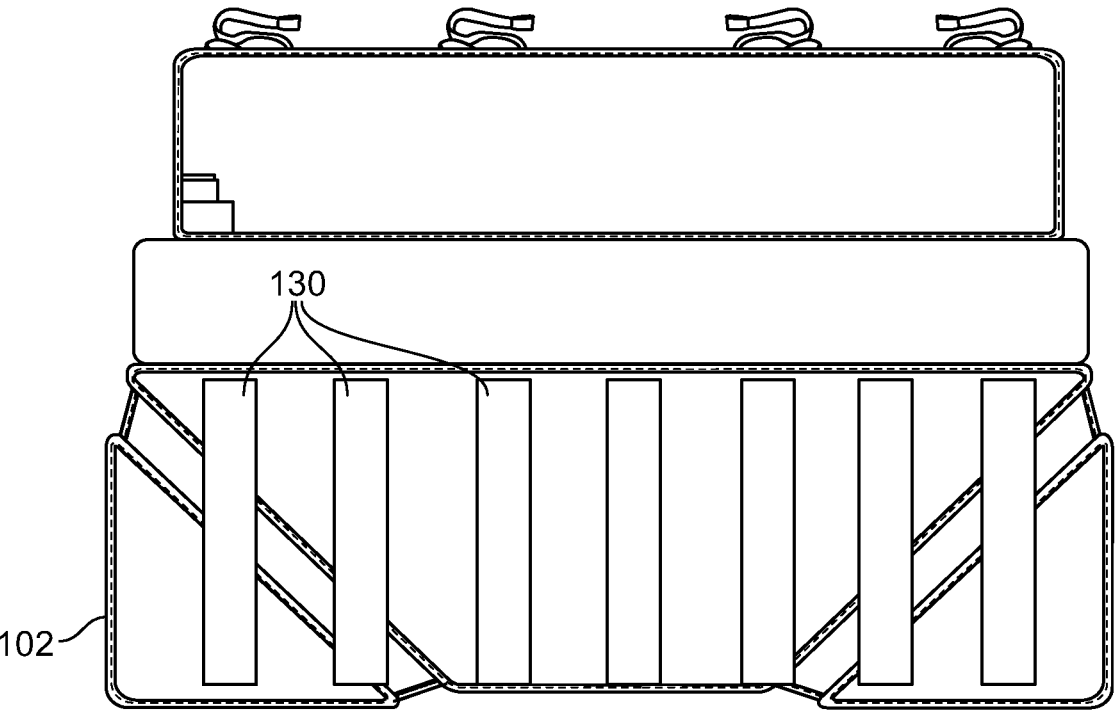
FIGS. 7A and 7B illustrate a tailgate pad, in accordance with embodiments of the present disclosure.
Figure 7B:
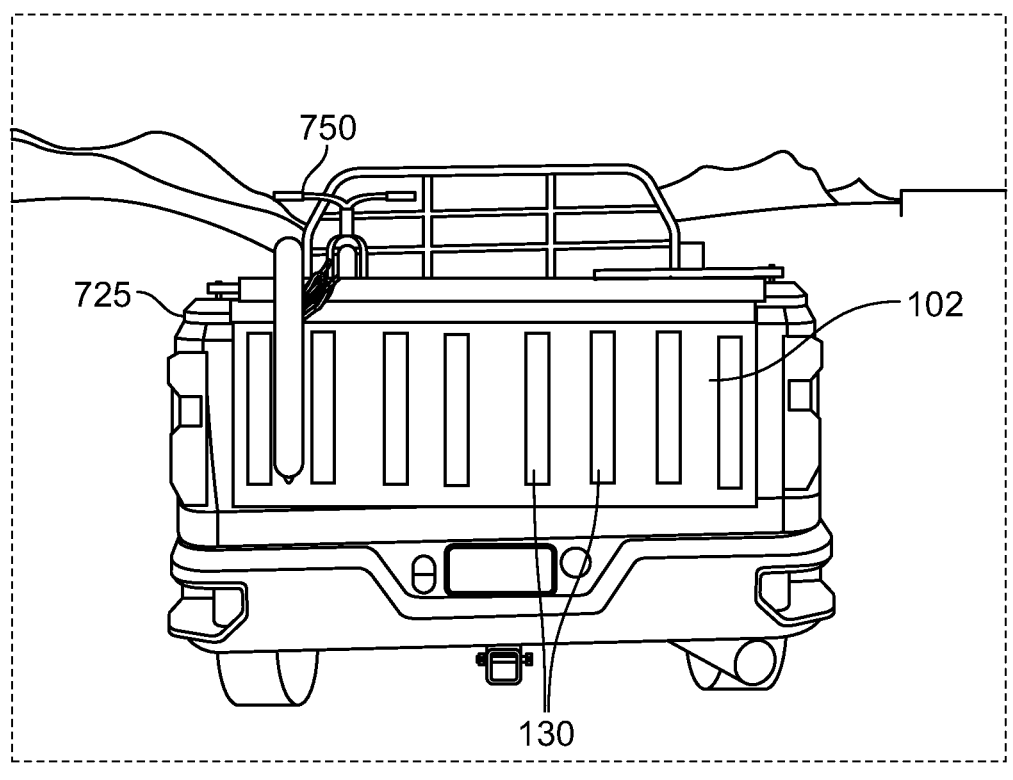

In some embodiments, outside panel 102 and/or inside panel 104 comprise one or more raised pads 130. Raised pads 130 provide extra padding for an item that is placed against it. Like the outside panel 102, in some embodiments raised pads 130 comprise a foam or other soft material. In some embodiments, raised pads 130 have a thickness (extending outward from the front fact of outside panel 102) such that the raised pads will extend past the bumper of a vehicle. In these embodiments, if an item is placed against the outside panel 102, the item will clear the bumper and not abut against it. In some embodiments, for example with reference to FIG. 1, raised pads 130 are rectangularly shaped in a reverse pyramid fashion. In other embodiments, raised pads 130 can be shaped in any geometrical shape and can constitute any number of pads in any number of orientations. In one embodiment, and with reference to FIGS. 7A and 7B, raised pads are spaced in a vertical manner on outside panel 102 such that each of spaces is sized to accommodate a wheel 725 of a bicycle 750. In such embodiments, the raised pads minimize the wheel 725 of bicycle 750 from moving about too much during transportation of bicycle 750.

With further reference to FIG. 1, in many embodiments, tailgate pad 100 includes a folding panel 106 disposed between the inside panel 104 and outside panel 102. In some embodiments, folding panel 106 is configured in an accordion-style structure such that at least a portion of folding panel 106 is foldable into a stacked configuration. The accordion-style structure allows folding panel 106 to accommodate various thicknesses of vehicle tailgates. That is, in some embodiments, depending on a given thickness of a vehicle's tailgate, portions of folding panel 106 are unfolded in some amount to increase the overall height of the folding panel 106 (e.g., the distance between the portion of folding panel 106 that is coupled to the inside panel and the portion of folding panel 102 that is coupled to the outside panel 102.) By being disposed between the inside panel 104 and the outside panel 102, folding panel is configured to be fixedly attached between the two panels.

In some embodiments, and with reference to FIGS. 4A and 4B, folding panel 106 comprises one or more ribs 402 separated from one another with nylon, plastic, polyester, fleece, microfiber, flannel, a synthetic and/or natural textile lining, a tricot fabric, a non-woven textile, polymer foams, and the like.

In some embodiments, each rib 402 has the same thickness (i.e., the distance from one edge of a rib the other edge of a rib). In other embodiments, and with reference to FIG. 4B, ribs 402 have varying thicknesses, for example with every other rib having the same thickness. In some embodiments, each rib 402 has the same height, for example, as illustrated in FIG. 4B. In other embodiments, one or more ribs 402 has a different height from the other ribs. With further reference to FIG. 4A, the accordion-nature of folding panel 106 allows for the ribs 402 to be shaped to the width of a tailgate 140.

Figure 5A:
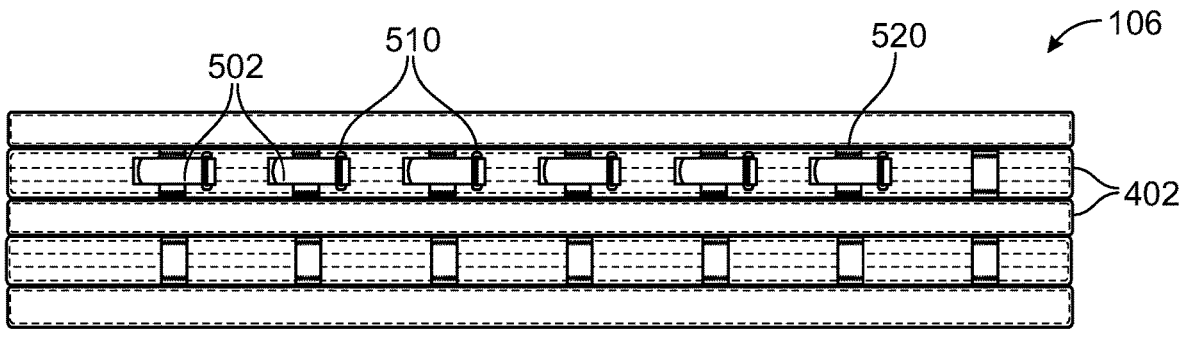
FIGS. 5A-C are views of various features of a folding panel, in accordance with embodiments of the present disclosure.
Figure 5B:
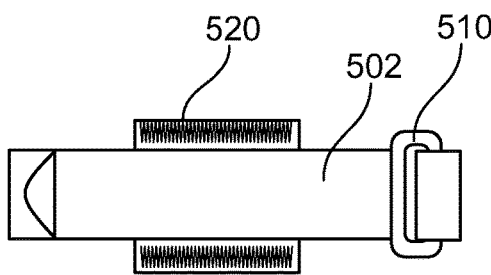
Figure 5C:
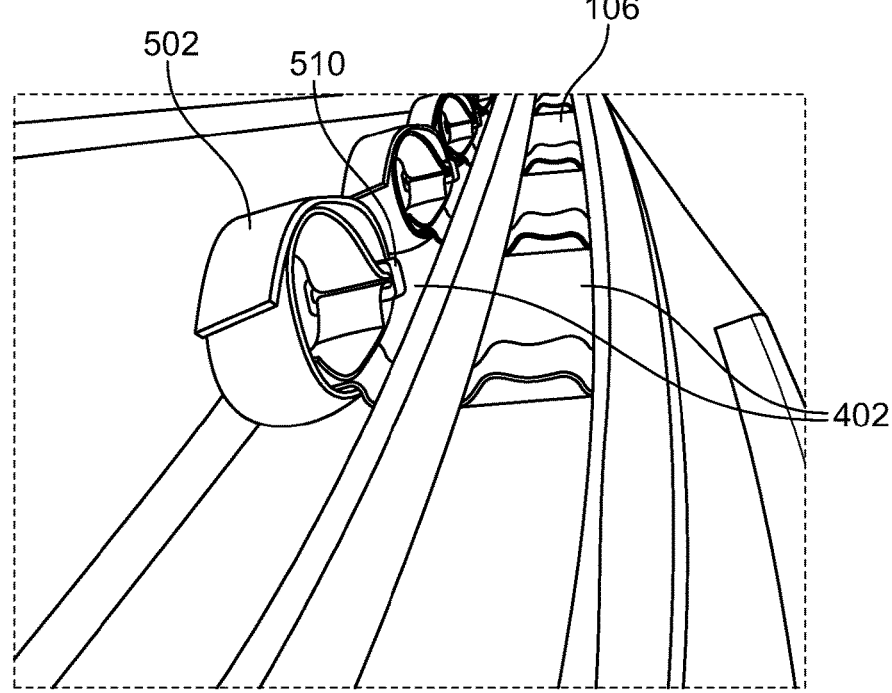

In some embodiments, and with reference to FIGS. 5A-5C, one or more ribs 402 of folding panel 106 include straps 502 and fasteners 510. In some embodiments, folding panel 106 includes six straps 502 and fasteners 510, however, in other embodiments, any number of straps 502 and fasteners 510 can be used. In some embodiments, straps 502 and fasteners 510 are similar to those described herein. For example, in some embodiments, each of fasteners 510 comprises a tab (not shown) and a fastening device. Each tab is affixed to a portion of rib 402. Examples of fastening devices may include, but are not limited to, a buckle, a cinch ring, a hook-and-loop fastener, a clamping lock, a spring snap clip, a ladderlock buckle, etc. In some embodiments, straps 502 include a Velcro portion to aid in securing the strap.

Referring still to FIGS. 5A-C, in various embodiments, straps 502 and fasteners 510 are used to secure an item, such as a bicycle, to a tailgate. In one such embodiment, straps 502 are configured to be placed over a portion of the item to couple to the fasteners 510 to secure the straps 502 around the item and to the folding panel 106.

In other embodiments, rib 402 has one or more bartacked plates 520 affixed to straps 502. Each strap 502 is fed through the bartacked plates 520 and fastened to the fastening device of fastener 510.

In some embodiments, each of inside panel 104, outside panel 102 and folding panel 106 of tailgate pad 100 are comprised of a tailgate-facing surface and an exterior-facing surface. In some embodiments, at least a portion of one, each or every tailgate-facing surface of inside panel 104, outside panel 102 and folding panel 106 are comprised of a material that protects the painted surface of a vehicle from damage. The paint protecting material includes, but is not limited to, nylon, plastic, polyester, fleece, microfiber, flannel, a synthetic and/or natural textile lining, a tricot fabric, a non-woven textile, polymer foams, and the like. In some embodiments, each of each of inside panel 104, outside panel 102 and folding panel 106 comprises a foam or other padding material. In one embodiment, at least a portion of the other tailgate-facing surfaces of pad 100 that are not abutted against a painted surface of tailgate (e.g., such as the top and the interior of tailgate, which may include a hard protective cover or be coated with a protective material such as a spray on bed liner). In these embodiments, other tailgate-facing surfaces of pad 100 are comprised of a more durable material such as nylon, polyamide (PA), rayon (e.g., Cordura), denim, a stretched polytetrafluoroethylene (PTFE) (e.g., Gor-Tex), an aramid (e.g., Kevlar, Nomex, Technora, and the like), a thermoplastic polymer, polyester, polyvinyl chloride (PVC), silicone, and the like. In some embodiments, one or all exterior-facing surfaces of inside panel 104, outside panel 102 and folding panel 106 comprise a durable material such as nylon, polyamide (PA), rayon (e.g., Cordura), denim, a stretched polytetrafluoroethylene (PTFE) (e.g., Gor-Tex), an aramid (e.g., Kevlar, Nomex, Technora, and the like), a thermoplastic polymer, and the like.

With reference now to some embodiments illustrated in FIGS. 6A-6D, a method of installing the tailgate pad 100 to a tailgate 600 and attaching a bicycle to the tailgate pad 100 is shown. For example, tailgate pad 100 is placed on the open tailgate 600, such that inside panel 104 is aligned with and lays upon inside tailgate 602. The second ends of the straps 108 are threaded through the opening 610 of the tailgate. The tailgate 600 is then moved to a closed or semi-closed position such that folding panel 106 folds over the top portion of tailgate 600 in an accordion-like manner and is aligned around a top portion of tailgate 600. In this manner, outside panel 102 abuts the outside portion of tailgate 600 and can be aligned along an outside portion of the tailgate 600.

Figure 6A:
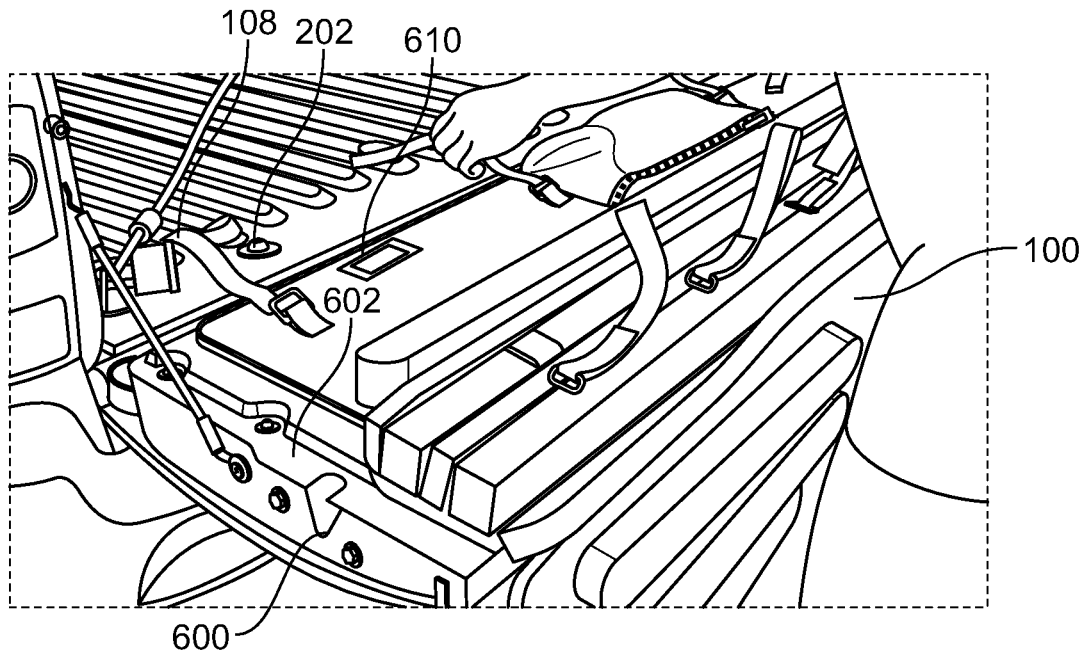
FIGS. 6A and 6B illustrate a method of installing the tailgate pad to a tailgate, in accordance with embodiments of the present disclosure.
Figure 6B:
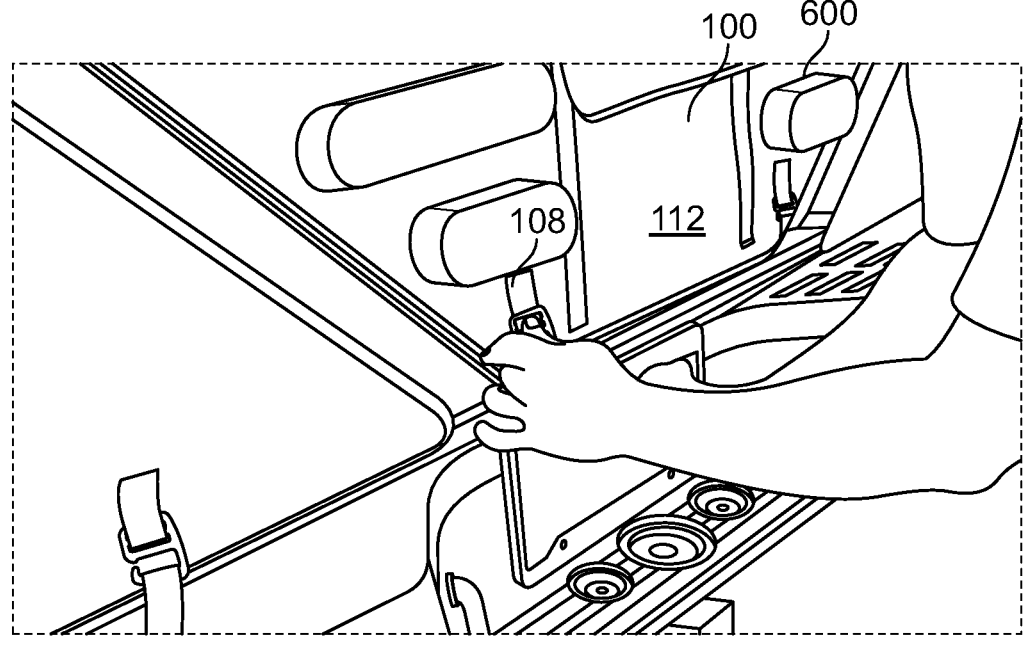

With respect to an embodiment illustrated in FIG. 6B, the straps 108 are then coupled or fastened to fastening devices 112 of fasteners 110 to facilitate securing pad 100 onto tailgate 600.

Figure 6C:
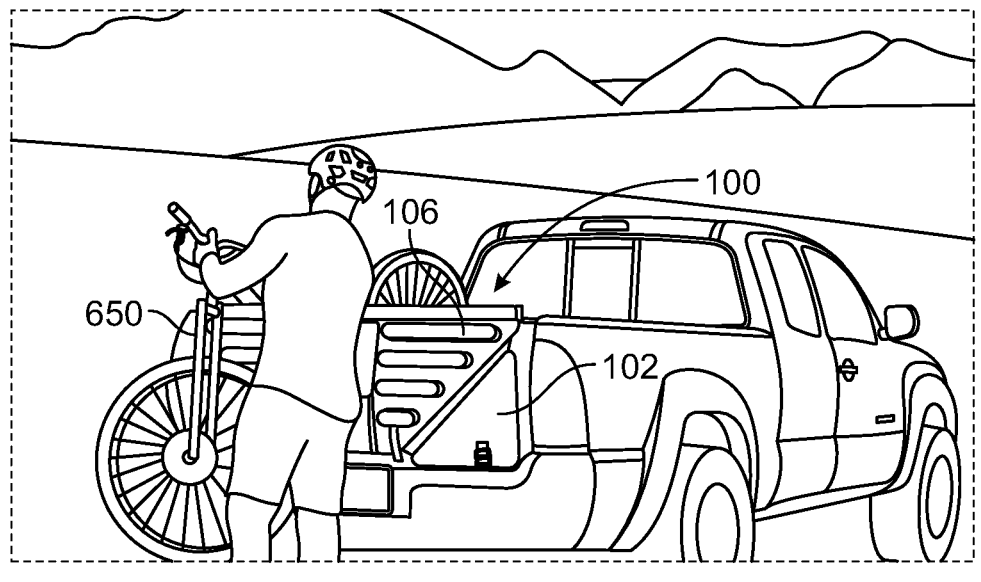
FIGS. 6C and 6D illustrate a method of attaching a bicycle to a tailgate pad, in accordance with embodiments of the present disclosure.
Figure 6D:
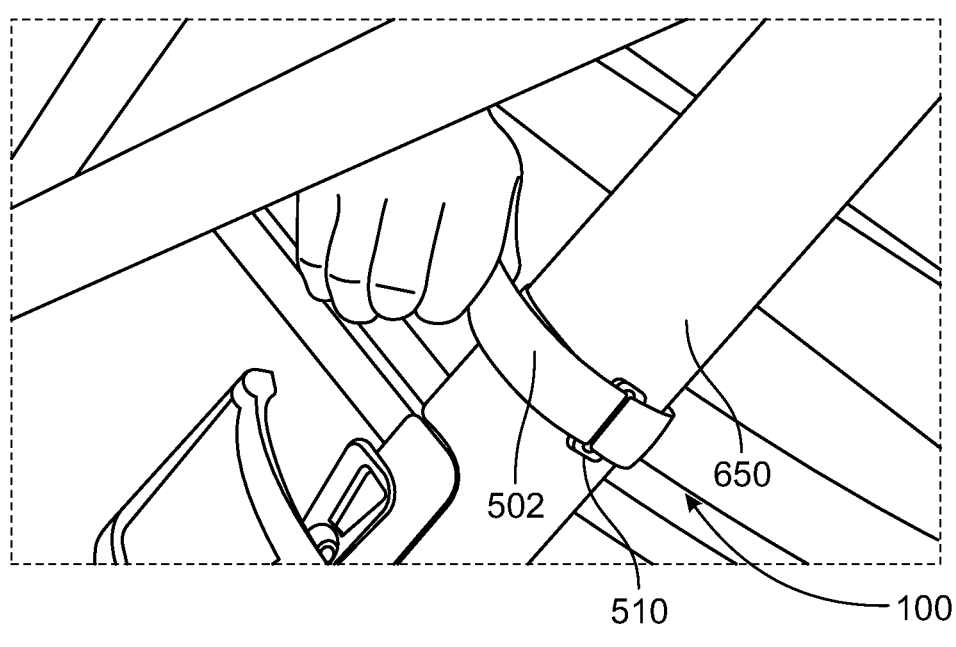

In one embodiment, and with reference to FIGS. 6C and 6D, a bicycle 650 (or bicycles) is loaded partially into a vehicle bed 675, and partially on top of pad 100, such that the front tire abuts outside panel 102 and the frame of the bicycle sits along folding panel 106. The bicycle 650 is secured onto pad 100 by placing strap 502 around a portion of the frame of bicycle 650 and then coupling the strap 502 to the fastening device of fasteners 510.

It should be noted that any of the features disclosed herein may be useful alone or in any suitable combination. While the foregoing is directed to embodiments of the present disclosure, other and further embodiments may be implemented without departing from the scope of the disclosure, and the scope thereof is determined by the Claims that follow.

What is claimed is:

1. A tailgate pad comprising:
an inside panel;

an outside panel; and
a folding panel, wherein the folding panel comprises a plurality of ribs to extend the folding panel over a top end of tailgate; and
an adjustable window coupled to the outside panel, wherein the adjustable window comprises a door that slidingly moves along two rails.

2. The tailgate pad of claim 1, further comprising a plurality of straps coupled to the inside panel, at least one of said plurality of straps configured to be coupled to a respective at least one of a plurality of fasteners coupled to the outside panel to facilitate securing the tailgate pad to a tailgate.

3. The tailgate pad of claim 1, further comprising a plurality of raised pads coupled to the outside panel.

4. The tailgate pad of claim 3, wherein:
the outside panel has a width and a length that is shorter than the width; and
the plurality of raised pads are spaced in a direction along the width to accommodate a wheel of a bicycle between each of the raised pads and an adjacent one of the raised pads.

5. The tailgate pad of claim 1, further comprising a raised pad coupled to the inside panel.

6. The tailgate pad of claim 1, further comprising a pocket coupled to the inside panel.

7. The tailgate pad of claim 1, further comprising two or more straps coupled to a rib of the folding panel, wherein the two or more straps are configured to couple to a plurality of fasteners affixed to the folding panel.

8. A tailgate pad, comprising:
an inside panel;
an outside panel;
a folding panel, wherein the folding panel comprises a plurality of ribs to extend the folding panel over a top end of tailgate, wherein each rib has a thickness; and
two or more straps coupled to a rib of the folding panel, wherein the two or more straps are configured to couple to a plurality of fasteners affixed to the folding panel.

9. The tailgate pad of claim 8, wherein the thickness of each rib varies between ribs.

10. The tailgate pad of claim 8, wherein each of the plurality of ribs is separated from one another by one of nylon, plastic, polyester, fleece, microfiber, flannel, a synthetic and/or natural textile lining, a tricot fabric, a non-woven textile, and polymer foams.

11. The tailgate pad of claim 8, further comprising an adjustable window coupled to the outside panel, wherein the adjustable window comprises a door that slidingly moves along two rails.

12. A method of installing a tailgate pad, the method comprising:
aligning an inside panel to an inside portion of a tailgate, wherein the tailgate is in an open position;
threading one or more straps coupled to the inside panel through an opening in the tailgate;
closing the tailgate;
aligning a folding panel around a top portion of the tailgate, the folding panel including two or more straps coupled to a rib of the folding panel, wherein the two or more straps are configured to couple to a plurality of fasteners affixed to the folding panel;
alinging an outside panel along an outside portion of the tailgate; and coupling the one or more straps into one or more fasteners coupled to the outside panel.

\* \* \* \* \*